Figure 3:
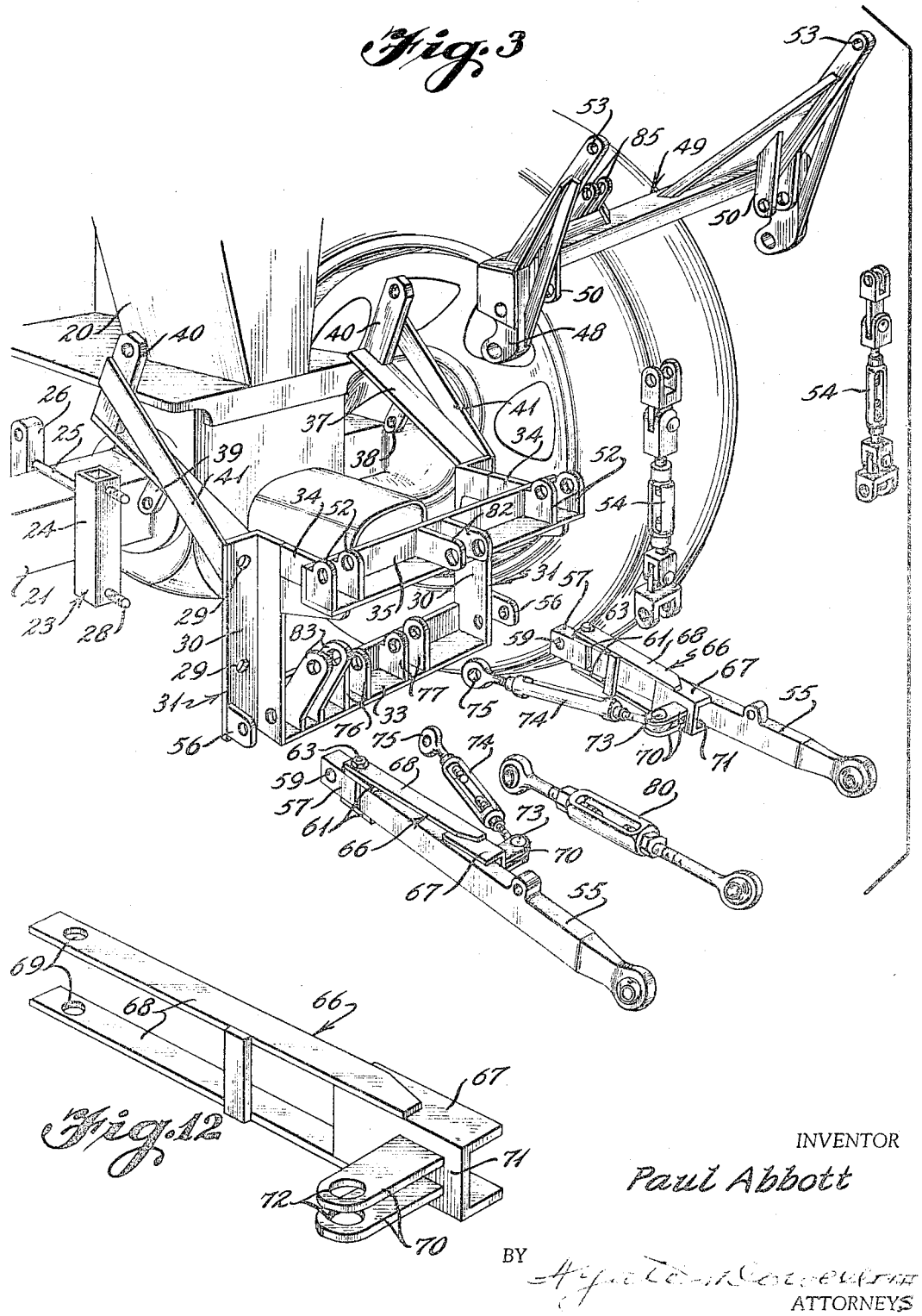

March 21, 1967  P. D. ABBOTT  3,310,123
TRACTOR HITCH SELECTIVELY ADJUSTABLE STABILIZER
Filed Dec. 8, 1964  4 Sheets-Sheet 1
Fig. 1
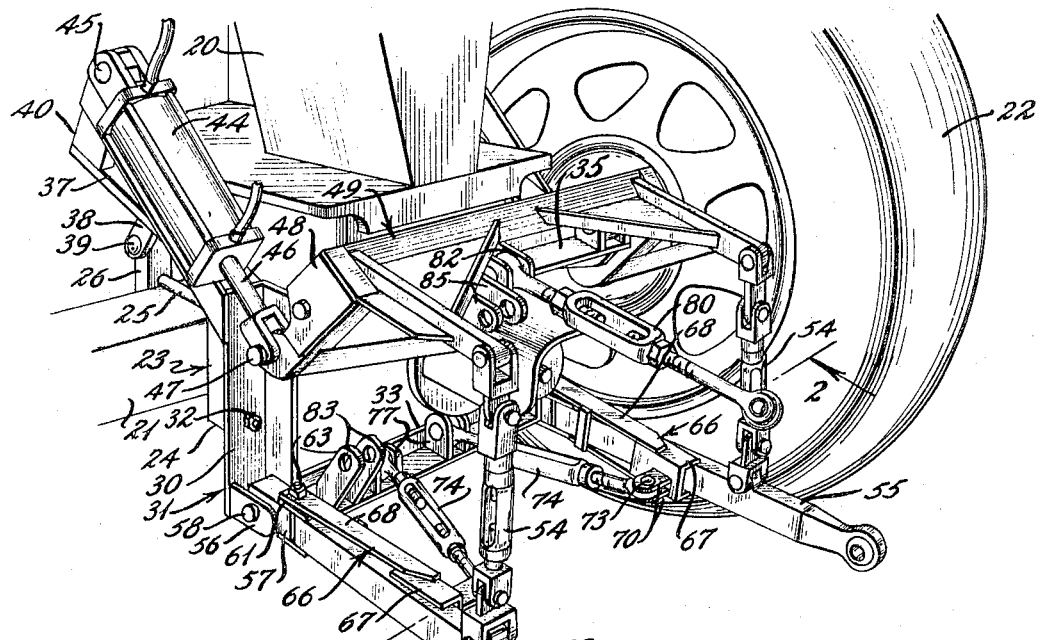
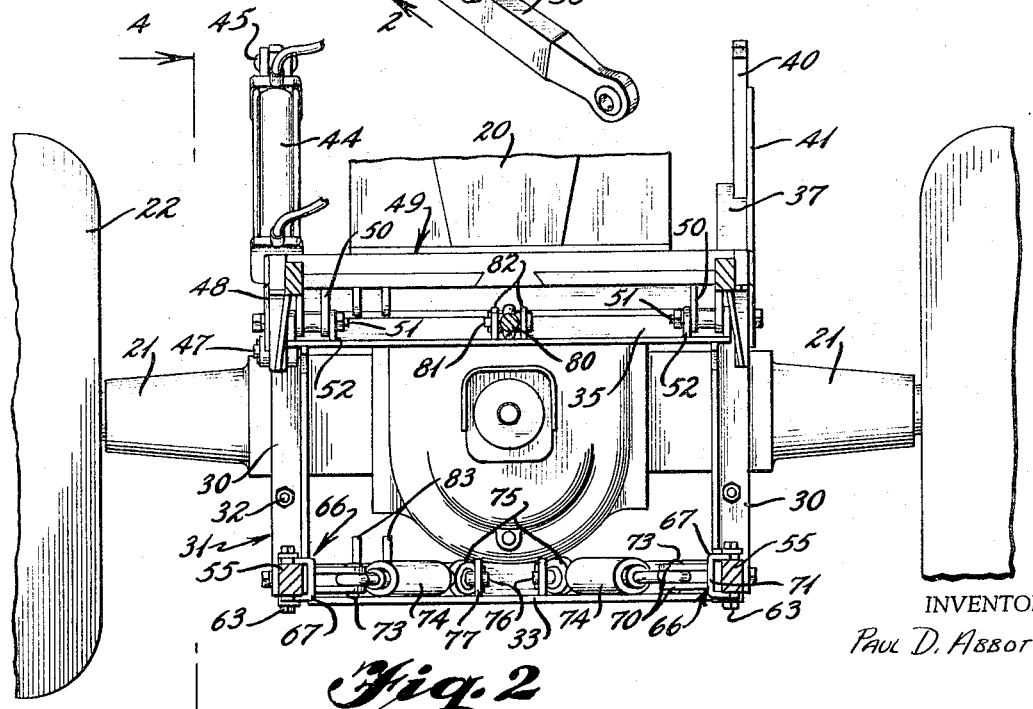
Fig. 2
INVENTOR
PAUL D. ABBOTT
BY
ATTORNEYS INVENTOR
Paul Abbott

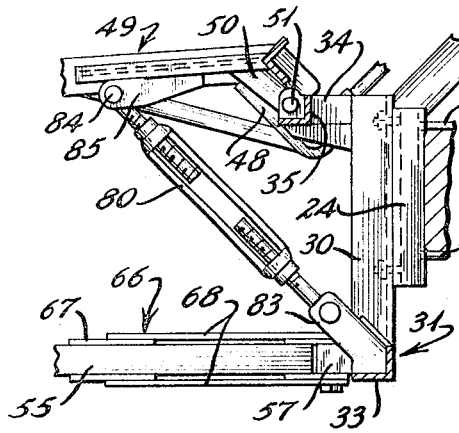
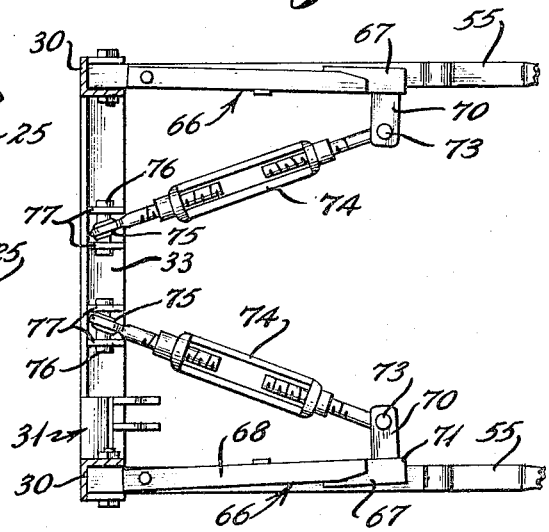
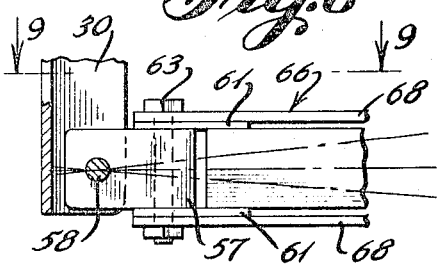
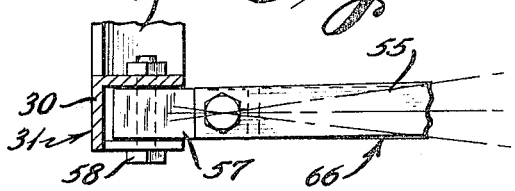
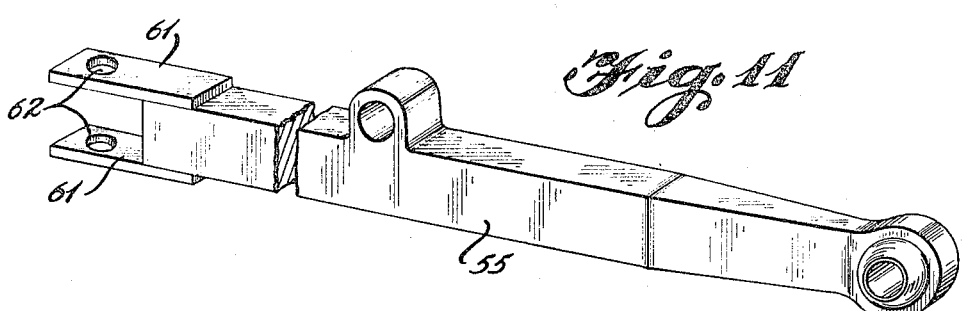
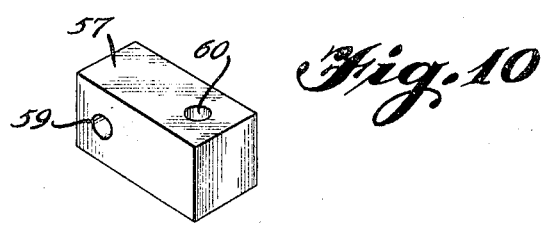
INVENTOR
Paul Abbott

United States Patent Office 3,310,123
Patented Mar. 21, 1967

3,310,123
TRACTOR HITCH SELECTIVELY ADJUSTABLE
STABILIZER
Paul D. Abbott, P.O. Box 187, Blytheville, Ark. 72315
Filed Dec. 8, 1964, Ser. No. 416,700
5 Claims. (Cl. 172—450)

This invention relates to cultivation of the earth by implements drawn by a propelling vehicle and to apparatus and equipment by which the relative positions of the implement and vehicle are controlled during the traverse of the field.

The invention relates particularly to apparatus which is mounted on a propelling vehicle and is engageable with the lift arms thereof and utilized to stabilize and control the position of earth-working implements relative to the vehicle.

Heretofore, many devices have been provided to stabilize a trailer type vehicle relative to a propelling vehicle and some of such devices have included means for stabilizing the lift arms of a tractor in an attempt to control the position of a trailer mounter implement or to prevent swaying and drifting of the implement relative to the tractor including the connecting of adjustable members such as turnbuckles from the tractor to the hydraulically operated lift arms. These prior devices have been expensive, difficult to operate and maintain, have failed mechanically in a short time, have the ability to move the lift arms in both directions, and for other reasons have proved unsatisfactory.

It is an object of the invention to provide a selectively adjustable stabilizing mechanism which can be easily applied and adjusted and which will permit free movement of the lift arms in a generally vertical direction while limiting the movement of such arms and the implement attached thereto in a generally horizontal direction.

Another object of the invention is to provide a selectively adjustable stabilizing apparatus engageable with the lift arms of a tractor which permits free movement of such arms in a generally vertical direction and in an outward direction but which prevents movement of the lift arms in an inward direction.

Still another object of the invention is to provide a selectively adjustable stabilizing apparatus having a plurality of pivotal connections and in which any force applied to the pivotal connections will be a pushing force and not a pulling force.

A further object of the invention is to provide a selectively adjustable stabilizing apparatus carried by a propelling vehicle in which the stabilizing apparatus can be adjusted so that the implement is not in alignment with the tractor.

A still further object of the invention is to provide a selectively adjustable stabilizing apparatus mounted on a frame carried by a tractor and such frame includes apparatus for raising and lowering the lift arms as well as means for maintaining the lift arms in raised position without the aid of the hydraulic system of the tractor.

Figure 4:
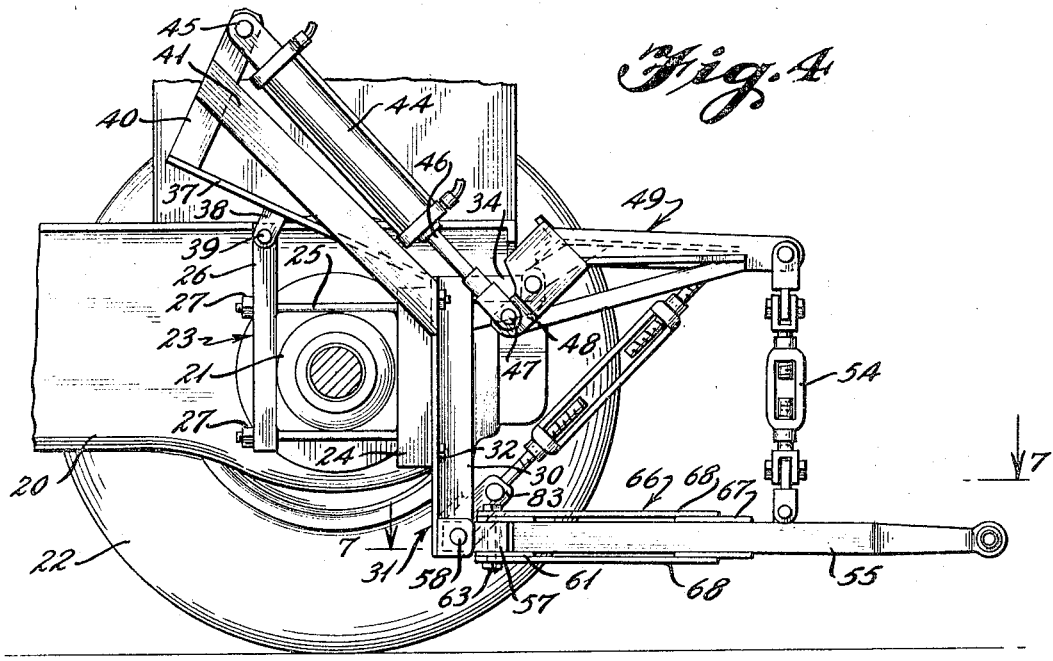
Figure 5:
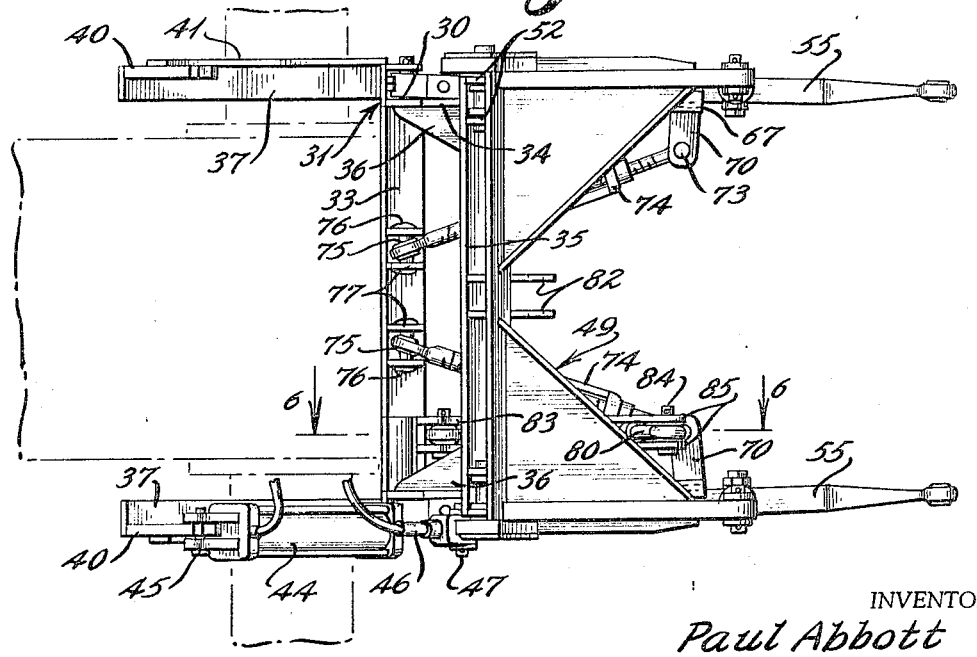

Other objects and advantages of the invention will be apparent from the following description taken in conjunction with the accompanying drawings wherein:

FIG. 1 is a perspective illustrating one application of the invention as applied to a tractor;

FIG. 2, a rear elevation thereof with portions broken away for clarity;

FIG. 3, an exploded perspective of the various parts of the selectively adjustable stabilizer;

FIG. 4, a side elevation;

FIG. 5, a top plan view;

FIG. 6, a fragmentary vertical section on the line 6—6 of FIG. 5;

FIG. 7, a section taken on the line 7—7 of FIG. 4;

FIG. 8, an enlarged fragmentary side elevation of the lift arm mounting means;

FIG. 9, a top plan view thereof;

FIG. 10, an enlarged perspective of the universal mounting block which supports the lift arms;

FIG. 11, an enlarged perspective of one of the lift arms; and

FIG. 12, an enlarged perspective of one of the stabilizing arms.

Briefly stated the present invention is a selectively adjustable stabilizer for the lift arms of a tractor to control the stability and location of the implement relative to the tractor and such apparatus includes a frame mounted on the tractor and having a pair of stabilizer arms pivotally mounted thereon by universal connections in such a manner that the lift arms are freely movable in a generally vertical direction and are freely movable in an outward generally horizontal direction but which are limited in an inward generally horizontal direction by a pair of stabilizer arms pivotally mounted at one end on the universal connections and having lift arm engaging means at the other end. The stabilizer includes an adjustable member, such as a turnbuckle connected at one end to the frame, and at the opposite end to the lift arm engaging means of the stabilizer arms in such a manner that any force applied to the turnbuckles will be a pushing force and not a pulling force.

With continued reference to the drawings, a tractor 20 is provided having a rear axle housing 21 supported by ground-engaging wheels 22. A mounting clamp 23 is attached to the axle housing 21 on each side of the tractor and such clamp includes a rear member 24 to which a pair of spaced bolts 25 are welded or otherwise attached. The bolts 25 are spaced apart a distance slightly greater than the axle housing and are disposed above and below the same. The free ends of the bolts pass through a front member 26 and are connected thereto by nuts 27 which clamp the front and rear members to the axle housing 21. Each rear member 24 has a pair of spaced rearwardly extending studs 28 which are received within openings 29 in an angular side member 30 at each side of a main frame 31 and are connected thereto by nuts 32.

The side members 30 are connected at their lower ends by a bottom member 33 and the upper end of each side member is provided with a rearwardly extending plate 34 the outer ends of which are connected by an upper member 35. If desired gussets 36 are provided which connect the upper member 35 to the side members 30 for added strength and rigidity. Each of the side members 30 has a forwardly and upwardly extending inclined plate 37 with downwardly depending lugs 38 intermediate its ends and such lugs are connected by a bolt 39 to the upper extremity of front member 26 of the mounting clamp to support the plate 37. An upstanding bracket 40 is mounted on the forward free end of each of the plates 37 and is connected to the side member 30 by a brace 41.

A fluid cylinder 44 is pivotally connected at one end by a pin 45 to the bracket 40 and such cylinder has a piston rod 46 connected at its free end by a pin 47 to the operating arm 48 of a generally U-shaped auxiliary or lifting frame 49. The auxiliary frame 49 has depending projections 50 which are adapted to be pivotally connected by hinge pins 51 to a pair of spaced lugs 52 welded or otherwise attached to the upper member 35. The pins 51 also extend through openings 53 in the operating arms 48 in such a manner that the auxiliary frame 49 is pivotally connected to the frame 31 so that movement of the piston rod 46 within the cylinder 44 will pivot the lifting frame above the pins 51. Normally a single fluid cylinder 44 is sufficient for most purposes and such cylinder can be located on either side of the frame 31.

However, it is contemplated that a cylinder 44 could be mounted on both sides of the frame if desired.

As illustrated particularly in FIGS. 1, 3 and 4, the outer ends of the U-shaped auxiliary frame 49 are pivotally connecting the lift arms 55 to the block in a manner to ing members 54 such as turnbuckles or the like to a pair of lift arms 55 so that up-and-down movement of the lifting frame will raise and lower the lift arms a corresponding distance.

The lift arms 55 are mounted at one end to the frame 31 by a universal connection in order to permit the lift arms to move both in vertical and horizontal directions. In order to do this, each of the side members 30 is provided with a rearwardly extending lug 56 so that a universal block 57 can be disposed between the lug 56 and one portion of the angular side member 30 and connected thereto by a pivot 58 passing through an opening 59 in the block in such a manner that the block 57 is freely movable in a generally vertical direction. The block 57 has a second opening 60 in spaced relation to the opening 59 and disposed generally at right angles thereto for pivotally connecting the lift arms 55 to the block in a manner to permit free movement of the lift arms in a generally horizontal direction. This is done by welding or otherwise attaching a pair of plates 61 to the end of each of the lift arms 55 and providing openings 62 in such plates for the reception of a pivot 63 which passes through the opening 60 and pivotally connects the lift arms to the universal blocks 57.

In order to stabilize the lift arms 55 a pair of stabilizer arms 66 are provided each of which includes a channel member 67 of a size to snugly receive portions of the lift arms 55. Each channel member has a pair of generally parallel elongated mounting brackets 68 welded or otherwise attached to opposite sides thereof and each of such brackets has an opening 69 in the opposite end which pivotally receives the pivot 63 so that the stabilizer arms 66 and the lift arms 55 are pivotally mounted in a horizontal direction about the same pivot pin. A pair of spaced lugs 70 project inwardly from the web portion 71 of each channel member 67 and such lugs have openings 72 for the reception of pivot pins 73 to pivotally connect one end of an adjustable connecting member 74 such as a turnbuckle or the like between the lugs 70. The opposite ends of the adjustable connecting members preferably have a ball and socket type connection 75 disposd between and connected by pins 76 to upright brackets 77 fixed to the bottom member 33 of the main frame 31. Movement of the adjustable connecting members 74 will pivot the stabilizer arms 66 about the pivots 63 so that the channel members 67 can be in engagement with the lift arms 55 or spaced therefrom to permit free movement of such lift arms. Preferably the pins 76 are generally in alignment with the pivots 58 so that the lift arms 55 are freely movable in a vertical direction regardless of whether the channel members 67 are in engagement therewith or not.

As illustrated in FIG. 1, another adjustable connecting member 80 is pivotally connected by a pin 81 to a pair of lugs 82 mounted generally centrally of the upper member 35 of the frame 31 and such adjustable connecting member serves as the third connecting point of a three-point connection. If desired the adjustable connecting member 80 can be removed from the lugs 82 and connected at one end to a pair of lugs 83 fixed to the bottom member 33 of the main frame 31 and the opposite end of such connecting member can be connected by a pin 84 to a pair of lugs 85 carried by the U-shaped auxiliary frame 49 to relieve the fluid cylinder 44 and to retain the lifting frame 49 in a predetermined position regardless of whether the fluid cylinder is operative or not.

In the operation of the device the free ends of the lift arms 55 are connected to an earth-working implement and if the implement is of a three-point hitch type, the adjustable connecting member 80 is connected to the lugs 82 and to the third point of the three-point connection. The fluid cylinder 44 then is activated and the piston rod 46 is extended to cause the auxiliary frame 49 to pivot about the pins 51 and raise the implement from the ground. The tractor then moves to the field and the piston rod 46 is retracted so that the implements are in engagement with the ground and if desired may be set to penetrate a predetermined distance. In order to stabilize the implement and prevent swaying or drifting of the implement relative to the tractor, the adjustable connecting members 74 are operated so that the channel members 67 of the stabilizer arms 66 are in engagement with the lift arms 55.

Due to the construction of the stabilizer arms, the lift arms are freely movable outwardly so that if the implement tends to drift toward the left side of the tractor the right lift arm will engage the right stabilizer arm and exert a pushing force through the adjustable connecting member and prevent the implement from drifting. If the implement should tend to drift to the right the left lift arm will engage the left stabilizer arm and will prevent such drifting to the right. Since the channel members 67 are substantially in engagement with the lift arms 55, there will be a minimum amount of wear between the parts and since the force applied to the adjustable connecting members is a pushing force, the ball and socket type connections will not be forced out of alignment as they are when a pulling force is applied thereto.

If it is desired to offset the implement so that it will not follow directly behind the tractor, one of the adjustable connecting members 74 may be extended while the other member is retracted. This will move the free ends of both lift arms 55 toward one side so that the implement will be offset from the tractor while providing stability to prevent drifting of the implement.

Due to the ability of the lift arm 55 to freely move outwardly, the free ends of the lift arms may be disconnected from the implement without disturbing the setting of the stabilizer arms 66 so that subsequently the implement may be reattached in the same position.

It will be noted that although the stabilizer arms 66 have been illustrated and described as engageable with the inner side of the lift arms 55, it is contemplated that such stabilizer arms could engage the outer sides of the lift arms by a mere reversal of parts. In this event, the lift arms 55 would be freely movable inwardly toward each other in a generally horizontal plane and would be prevented from moving outwardly.

It will be apparent that a relatively simple tractor hitch selectively adjustable stabilizer has been provided which will prevent an implement from drifting to either side and which permits free movement of the lift arms in a generally vertical direction as well as a generally horizontal outward direction.

It will be obvious to those skilled in the art that various changes may be made in the invention with departing from the spirit and scope thereof and therefore the invention is not limited by that which is illustrated in the drawings and described in the specification, but only as indicated in the accompanying claims.

What is claimed is:

1. A selectively adjustable stabilizer mounted on a propelling vehicle for stabilizing an implement comprising a clamp mounted on said vehicle, a main frame removably attached to said clamp, a generally U-shaped auxiliary frame pivotally mounted on said main frame, fluid means carried by main frame for operating said auxiliary frame, a pair of universal blocks freely pivotally mounted on said main frame for movement in a generally vertical direction, a lift arm having one end freely pivotally mounted on each of said blocks for movement in a generally horizontal direction, the opposite end of each lift arm engageable with said implement, means connecting said auxiliary frame with each of said lift arms, a stabilizer arm pivotally mounted on each of said blocks for movement in a generally horizontal direction, each stabilizer arm including a channel member engageable with said lift arms, an adjustable connecting member pivotally connected at one end to each channel member, the opposite end of each connecting member pivotally mounted on said main frame substantially in alignment with the vertical pivot of said blocks, whereby said channel member may be moved into and out of engagement with said lift arms selectively to control the position of said implement relative to said tractor.

2. A tractor hitch selectively adjustable stabilizer for mounting on a propelling vehicle comprising a main frame, a pair of spaced universal members pivotally mounted on said main frame permitting movement of said members in a generally vertical direction, a lift arm pivotally mounted on each of said universal members permitting movement of said lift arms in a generally horizontal direction, a stabilizer arm pivotally mounted on each of said universal members for movement in a generally horizontal direction, each stabilizer arm including means selectively engageable with one side of said lift arms, an adjustable connecting member pivotally connected at one end to said selectively engageable means and pivotally connected at the opposite end to said main frame substantially in alignment with the pivot permitting vertical movement, whereby each lift arm is freely movable in a generally vertical direction and is freely movable in one direction in a horizontal plane.

3. The structure of claim 2 including an auxiliary frame pivotally mounted on said main frame, fluid means carried by said main frame for operating said auxiliary frame, and means connecting said auxiliary frame and said lift arms for controlling the vertical position of said lift arms.

4. The structure of claim 3 including means for maintaining said auxiliary frame in fixed position relative to said main frame.

5. A tractor hitch selectively adjustable stabilizer for mounting on a propelling vehicle comprising a pair of spaced universal members pivotally mounted on said vehicle for movement of said members in a generally vertical direction, a lift arm pivotally mounted on each of said universal members for movement in a generally horizontal direction, a stabilizer arm pivotally mounted on each of said universal members adjacent to each of said lift arms for movement in a generally horizontal direction, each stabilizer arm including means selectively engageable with at least one side of said lift arm, an adjustable connecting member pivotally connected at one end to said selectively engageable means and pivotally connected at the opposite end to said vehicle substantially in alignment with the pivot permitting vertical movement, whereby each lift arm is freely movable in a generally vertical direction and is freely movable in one direction in a horizontal plane.

References Cited by the Examiner

UNITED STATES PATENTS

| | | | |
|---|---|---|---|
| 2,673,506 | 3/1954 | Miller et al. | 172—450 X |
| 2,935,145 | 5/1960 | Du Shane et al. | 172—450 |
| 3,207,529 | 9/1965 | Harper | 172—450 |

ABRAHAM G. STONE, *Primary Examiner.*

WILLIAM A. SMITH III, *Examiner.*